United States Patent

Xie

[11] Patent Number: 5,940,419
[45] Date of Patent: Aug. 17, 1999

[54] FREQUENCY DOUBLING SOLID-STATE LASER INCLUDING LASANT MATERIAL AND NONLINEAR OPTICAL MATERIAL

[76] Inventor: Ping Xie, 1272 Chessington Dr., San Jose, Calif. 95131

[21] Appl. No.: 08/874,788

[22] Filed: Jun. 13, 1997

[51] Int. Cl.$^6$ ........................................................ H01S 3/10
[52] U.S. Cl. ............................... 372/22; 372/41; 372/99
[58] Field of Search .............................. 372/21, 22, 41, 372/98, 99, 105, 106, 108

[56] References Cited

U.S. PATENT DOCUMENTS

| 4,617,666 | 10/1986 | Liu | 372/22 |
|---|---|---|---|
| 4,618,957 | 10/1986 | Liu | 372/22 |
| 4,656,635 | 4/1987 | Baer et al. | 372/27 |
| 5,197,073 | 3/1993 | Oka | 372/22 |
| 5,446,749 | 8/1995 | Nighan, Jr. et al. | 372/22 |
| 5,805,626 | 9/1998 | Komatsu et al. | 372/22 |
| 5,809,048 | 9/1998 | Shichijyo et al. | 372/22 |

OTHER PUBLICATIONS

J.E. Geusic, et al., "Continuous 0.532$\mu$ solid–state souce using Ba2NaNb5O15", May 1, 1968, Applied Physics Letters, vol. 12 No. 9.

K.C. Liu and M.G. Cohen, "High power Nd: YAG laser at 532 nm using intracavity type II KTP", Conference Lasers Electro–Opt., paper TUK36, Jun. 1986.

T.M. Baer, "Large–amplitude fluctuations due to longitudinal mode coupling in diode–pumped intracavity–doubled Nd: YAG lasers", Sep. 1986, J. Opt. Soc. Am. B vol. 3 No. 9.

R.A. Fields et al., Highly efficient Nd:YVO4 diode–laser end–pumped laser, Dec. 7, 1987, Applied Physics Letters, vol. 51 No. 23.

*Primary Examiner*—James W. Davie
*Attorney, Agent, or Firm*—Steve Shear; Jay Beyer

[57] ABSTRACT

A laser includes a pumping light source for producing a pumping beam and a laser resonator having an input mirror optically coupled to the pumping light source for receiving the pumping beam. The laser resonator also includes an output mirror, a lasant material, and a nonlinear optical material. The nonlinear optical material is placed inside the laser cavity and configured as a half-wave plate or a multiple of a half-wave plate at a first given fundamental lasing wavelength. The lasant material is placed against or near the input mirror of the laser resonator and oscillates in response to the pumping beam so as to generate a fundamental wave including (i) two substantially orthogonal linearly polarized modes at wavelengths at and/or about the first given wavelength, (ii) an additional mode at and/or about a second given wavelength that is relatively close to but different from the first given wavelength. The nonlinear material produces multiple second harmonic linearly polarized mode as its output that are at wavelengths at and/or about half the fundamental wavelengths. The laser resonator further includes a filter arrangement for allowing the additional mode at about the second given wavelength to leak out of the laser resonator. The oscillation of the additional mode at the second given wavelength is suppressed because of the filter arrangement. This results in a laser which produces only two substantially orthogonal linearly polarized fundamental modes at the first given wavelength. This laser has minimized sum frequency generation and its second harmonic output is thus free from "green noise".

29 Claims, 2 Drawing Sheets

FREQUENCY DOUBLING SOLID-STATE LASER INCLUDING LASANT MATERIAL AND NONLINEAR OPTICAL MATERIAL

BACKGROUND OF THE INVENTION

The present invention relates generally to lasers, and more particularly, to frequency doubling, solid-state lasers including a lasant material and a nonlinear optical material.

Frequency doubling lasers have been used for some time to produce green light lasers (see references 1 and 2 listed at the end of the description). Currently these lasers typically use a pumping light source, such as a laser diode, to cause a lasant material, such as neodymium yttrium vanadate (Nd:YVO$_4$), located within a laser resonator to lase thereby generating a fundamental wave at a wavelength at and/or about 1064 nm (see reference 3). The laser resonator also includes an input mirror, an output mirror, and a nonlinear material, such as potassium titanate phosphate (KTP). The nonlinear material receives the fundamental wave generated by the lasant material as its input and produces second harmonic waves of green light at wavelengths at and/or about 532 nm. The output mirror is used to allow the second harmonic waves to pass through as the laser output. However, both the output mirror and the input mirror are configured to reflect the wavelengths of the fundamental wave back and forth through the laser resonator, thereby continuing the laser process of the fundamental wavelength.

Although frequency doubling green lasers are commercially available, it has proved to be very difficult to provide a reliable, low noise green laser (see reference 4). In a first example of one of the factors which contributes to the noise problem, the lasant materials used in these lasers typically create a fundamental wave made up of multiple spectral modes (i. e. longitudinal modes which are separated by a multiple of the free spectral range which is determined by the laser cavity geometry). In a homogeneous broadened laser system, these spectral modes will compete for the same gain available in the laser resonator. The gain competition among different longitudinal modes is called "gain cross saturation". In the presence of nonlinear crystals, each longitudinal mode will frequency double itself, for example, 1064.1 nm can be frequency doubled to 532.05 nm. In addition to frequency doubling, two different longitudinal modes can also generate a radiation at a frequency that is the sum of theirs, for example, 1064.1 nm and 1064.0 nm can generate 532.02 nm radiation. The sum frequency generation creates a nonlinear coupling between different longitudinal modes. The gain cross saturation combined with sum frequency generation causes various modes to couple strongly with one another, leading to significant amplitude fluctuations in the second harmonic waves.

Further contributing to the noise problem, the inventor has discovered an additional, previously undefined fundamental wave mode. Specifically, in the case of using Nd:YVO$_4$ as the lasant material, an additional mode at a wavelength at and/or about 1084 nm is formed by the lasant material.

Popular approaches to remove the so called "green noise" include a single mode laser (see reference 5), two polarization modes laser (see reference 6) and multiple modes (more than 10) laser (see reference 7). However, the single mode approach usually involves a complex ring laser cavity or spectral narrowing elements such as etalons or birefringent tuners. The two mode approach has only been successful at relatively low output powers (tens of mW) and limited to only isotropical lasant materials such as Nd:YAG. The multiple modes approach generally employs a long and bulky laser cavity. The present invention addresses an alternative method to produce a compact, noise free, frequency doubled solid state laser in a cost effective way. "Green noise" is removed in an uniaxial gain medium using two orthogonally polarized modes of the fundamental waves with a filter arrangement.

In a linear cavity, counter-propagating waves at the same frequency will form a standing wave pattern composed of amplitude nodes and antinodes. The nodes are separated by one half of the laser wavelength in the propagating medium. These wave interference effects will introduce the so called spatial hole burning effect in the laser gain medium. In other words, the standing wave pattern will leave undepleted gain available for other modes to develop.

In a typical diode end-pumped solid state laser system, the lasant material is usually close to the input mirror at the end of the resonator. Since the nodes of the standing wave pattern always start from the input mirror, close by longitudinal modes are suppressed because they are nearly in phase with the oscillating mode in the vicinity of the input mirror. These modes slowly move out of phase as they travel away from the input mirror. In a homogeneous broadened laser system, only one longitudinal mode can develop at low pump intensity. However, when the laser system is many times above threshold, since the neighboring modes are not perfectly in phase, many longitudinal modes can develop.

As illustrated in FIG. 1, in the case of the 1084 nm mode (represented by the line indicated by reference numeral 2) and since the 1084 nm mode wavelength is longer than the wavelengths of the multiple 1064 nm modes (represented by the line indicated by reference numeral 4), the dephasing between the 1084 nm mode and the 1064 nm modes is much faster than that between the various 1064 nm modes. Thus the 1084 nm mode can take the undepleted gain from spatial holes burned by the 1064 nm modes and oscillate even at low pump power. Furthermore, even if the 1084 nm mode is not within the frequency doubling bandwidth of the nonlinear crystal, it may not double itself to 542 nm, but it can create a sum frequency radiation with 1064 nm modes at 537 nm. In addition to the mode coupling between different 1064 nm modes described above, mode coupling existing between 1064 nm and 1084 nm modes further increases the amplitude noise problem. The sum frequency generation between the 1064 nm and 1084 nm modes also creates an undesired oscillation at 537 nm.

The present invention provides a laser that significantly reduces these noise problems caused by the coupling of the various modes of the fundamental wave produced by the lasant material.

SUMMARY OF THE INVENTION

As will be described in more detail hereinafter a laser including a pumping light source and a laser resonator is herein disclosed. The pumping light source emits a predetermined optical pumping beam of radiation. The laser resonator includes an input mirror optically coupled to the pumping light source for receiving and passing therethrough the optical pumping beam. The laser resonator also includes an output mirror, a lasant material, and a nonlinear optical material. The lasant material is a material which lases in response to the predetermined optical pumping beam of radiation from the pumping light source so as to generate a fundamental wave including multiple linearly polarized modes at wavelengths at and/or about a first given wavelength and an additional mode at a wavelength at and/or about a second given wavelength relatively close to but different than the first given wavelength. The nonlinear optical material and the lasant material are positioned relative to the input mirror and the output mirror such that (i) the lasant material receives as its input the optical pumping beam after the pumping beam is caused to pass through the input mirror, (ii) the nonlinear optical material receives the fundamental wave generated by the lasant material as an input, and (iii) the output mirror receives an output from the nonlinear optical material. The nonlinear optical material is configured to act as a half wave plate or a multiple of a half wave plate. Placed against or near the input mirror of the laser resonator, the lasant material in response to the pumping beam generates a fundamental wave including (i) two substantially orthogonal linearly polarized modes at wavelengths at and/or about the first given wavelength and (ii) an additional mode at and/or about a second given wavelength that is relatively close to but different from the first given wavelength. The nonlinear material produces multiple second harmonic linearly polarized modes as its output that are at wavelengths at and/or about half the fundamental wavelengths. The laser resonator further includes a filter arrangement for allowing the additional mode at and/or about the second given wavelength to pass from the laser resonator as it is produced and for allowing at least a portion of the second harmonic modes to pass from the resonator as the laser output.

In one preferred embodiment of the present invention, the lasant material is neodymium yttrium vanadate (Nd:YVO$_4$), the first given wavelength is 1064 nm, the second given wavelength is 1084 nm, the nonlinear material is potassium titanate phosphate (KTP), and the filter arrangement includes a coating material which passes wavelengths at and/or about 1084 nm and 532 nm and reflects wavelengths at and/or about 1064 nm. The coating material may be located on the output mirror, which may be a clear YAG material. Alternatively, the coating material may be located on the output mirror side of the KTP nonlinear material. In another embodiment of the present invention, the lasant material is configured to act as a quarter wave plate.

BRIEF DESCRIPTION OF THE DRAWINGS

The features of the present invention may best be understood by reference to the following description of the presently preferred embodiments together with the accompanying drawings.

DETAILED DESCRIPTION

The present invention will now be described in detail using the examples of several embodiments. However, it should be understood that the invention may be embodied in many different forms without departing from the spirit or scope of the invention. Therefore, the examples given are to be considered as illustrative of the principles of the invention and are not intended to limit the invention to the specific details described.

Figure 1:
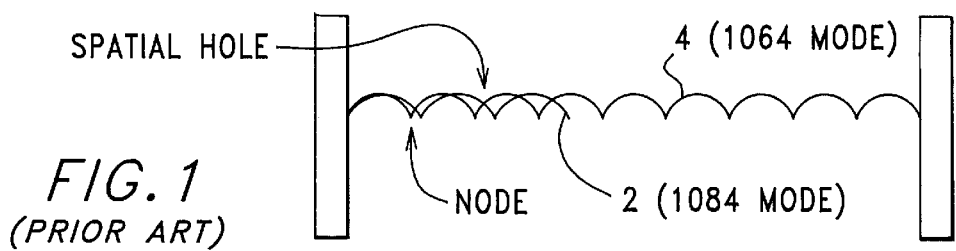
FIG. 1 is a diagrammatic illustration of the dephasing between a first mode of a fundamental wave at a wavelength at and/or about 1064 nm and a second mode of the fundamental wave at a wavelength at and/or about 1084 nm.
Figure 2:
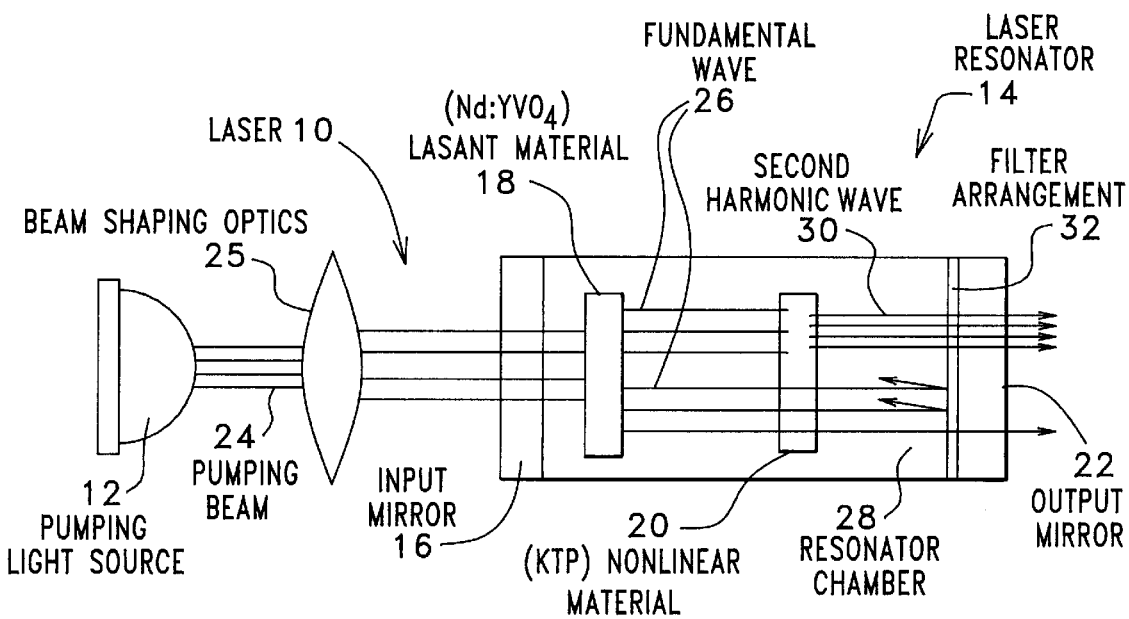
FIG. 2 is a diagrammatic illustration of a first embodiment of a laser in accordance with the present invention.

Turning to the drawings, wherein like components are designated by like reference numerals throughout the various figures, attention is initially directed to FIG. 2. This figure illustrates a laser designed in accordance with the present invention and generally designated by reference numeral 10. Laser 10 includes a pumping light source 12 and a laser resonator 14. Laser resonator 14 includes an input mirror 16, a lasant material or gain medium 18, a nonlinear material 20, and an output mirror 22.

Pumping light source 12 may take a wide variety of forms so long as it produces or emits a predetermined optical pumping beam of radiation, diagrammatically represented by lines 24. Pumping beam 24, when directed into lasant material 18 through a beam shaping optics 25 (lens or lens array), causes lasant material 18 to lase thereby producing a predetermined fundamental wave, indicated by lines 26, including multiple modes of light at wavelengths at and/or about a first given wavelength. In one preferred embodiment, pumping light source 12 is a laser diode which emits light at a wavelength at and/or about 809 nm. As is known in the art, laser diodes of this type are readily available.

Pumping light source 12 is arranged such that pumping beam 24 emitted from source 12 is optically coupled to and directed through input mirror 16 into laser resonator 14. Input mirror 16 and output mirror 22 are positioned at opposite ends of laser resonator 14. As will be described in more detail hereinafter, and in accordance with the present invention, input mirror 16 and output mirror 22 include a coating designed to reflect only the desired portion of fundamental wave 26 (i.e. the wavelengths at and/or about the first given wavelength) back and forth through lasant material 18 and nonlinear material 20 thereby forming the resonator 14.

Lasant material 18 is positioned within laser resonator 14 such that it receives pumping beam 24 emitted by pumping light source 12 as its input after pumping beam 24 passes through input mirror 16. Lasant material 18 lases in response to pumping beam 24 so as to generate fundamental wave 26. In one preferred embodiment, lasant material 18 is neodymium yttrium vanadate (Nd:YVO$_4$). Although Nd:YVO$_4$ is the preferred lasant material, other uniaxial or isotropical lasant materials may also be used. These other materials include, but are not limited to, Nd:CaWO$_4$, Nd:YLF, Nd:SFAP, Nd:YALO$_3$ and Nd:YAG.

Nonlinear material 20 is positioned within laser resonator 14 such that it receives fundamental wave 26 as its input. In a preferred embodiment, nonlinear material 20 is a nonlinear material such as potassium titanate phosphate (KTP) which, in response to fundamental wave input 26, produces as an output second harmonic waves indicated by lines 30. Although in a preferred embodiment the nonlinear material is described as KTP, this is not a requirement. The invention would equally apply to other nonlinear materials such as, for example, KNbO$_3$, LBO, MgO:LiNbO$_3$, and KDP.

As illustrated in FIG. 2 and as is known in the art, output mirror 22 includes a coating which allows at least a large portion of second harmonic waves 30 to pass through the output mirror as the laser output. Also, as mentioned above, the coatings on both output mirror 22 and the input mirror 16 are configured to reflect the desired first given wavelengths of the fundamental wave back and forth through the laser resonator thereby continuing the laser process. However, as will be described below and in accordance with the present invention, at least one of the coatings on either the output mirror or the input mirror is designed to suppress a very specific, undesired mode of the fundamental wave from oscillation inside the resonator. Alternatively, separate arrangements may be used to suppress the undesired mode of fundamental wave 26 inside the resonator from oscillation.

Now that the basic configuration of laser 10 has been described, the operation of the laser in accordance with the present invention will be described in detail. As mentioned above, pumping beam 24 is directed into laser resonator 14 thereby causing lasant material 18 to produce fundamental wave 26. With the configuration described above, fundamental wave 26 is actually made up of multiple spectral modes of light at wavelengths at and/or about the first given wavelength. In the situation where Nd:YVO$_4$ is used as the lasant material, this first given wavelength is 1064 nm and the multiple spectral modes of light are modes having about this first given wavelength of 1064 nm. Each of these various modes propagates along the optical axis of the lasant material and each of the modes is linearly polarized as it emits outside the laser cavity. As mentioned in the background, these multiple modes, which have slightly different wavelengths, tend to strongly couple to one another causing amplitude fluctuations in the fundamental wave.

In addition to the multiple modes clustered immediately around the first given wavelength, the inventor has discovered that when using a neodymium doped lasant material as described above, fundamental wave 26 also includes an additional mode or modes at and/or about a second given wavelength relatively close to but different than the first given wavelength. This additional mode or modes are produced as an intrinsic transition of the lasant material. In the case of Nd:YVO$_4$, the first given wavelength (the desired main oscillation wavelength of the fundamental wave) is 1064 nm as mentioned above. For Nd:YVO$_4$, the inventor has discovered that the additional mode(s) at the second given wavelength have a wavelength at and/or about 1084 nm. In the case of Nd:YAG, the first given wavelength is also 1064 nm and the additional mode at the second given wavelength is about 1061 nm. For Nd:YLF, the first given wavelength (the desired main oscillation wavelength) is 1047 nm and the additional mode at the second given wavelength is at 1053 nm. As described in the background, because the additional mode(s) at the second given wavelength have a wavelength relatively close to but different than the modes at the first given wavelength, the additional mode(s) also may strongly couple with the modes at the first given wavelength causing additional instability in the fundamental wave.

From this point on, the present invention will be described in terms of one preferred embodiment of the invention which uses Nd:YVO$_4$ as the lasant material and KTP as the nonlinear material. Since Nd:YVO$_4$ is used as the lasant material in the following descriptions, the first given wavelength corresponding to the desired main oscillation wavelength is about 1064 nm and the second given wavelength which corresponds to the additional wavelength discovered by the inventor is about 1084 nm as described above. It should be understood that the invention equally applies to other neodymium doped lasant materials and other nonlinear materials. In these cases of other lasant materials, the first and second given wavelengths may be different as also described above. However, the application of the principles described below when using lasant materials other than Nd:YVO$_4$ will be clear to those skilled in the art in view of this overall disclosure.

As mentioned above, nonlinear material 20 receives fundamental wave 26 from the lasant material as its input. In accordance with the present invention, nonlinear material 20 is configured as a half wave plate or a multiple of a half wave plate relative to the first given wavelength.

Figure 3:
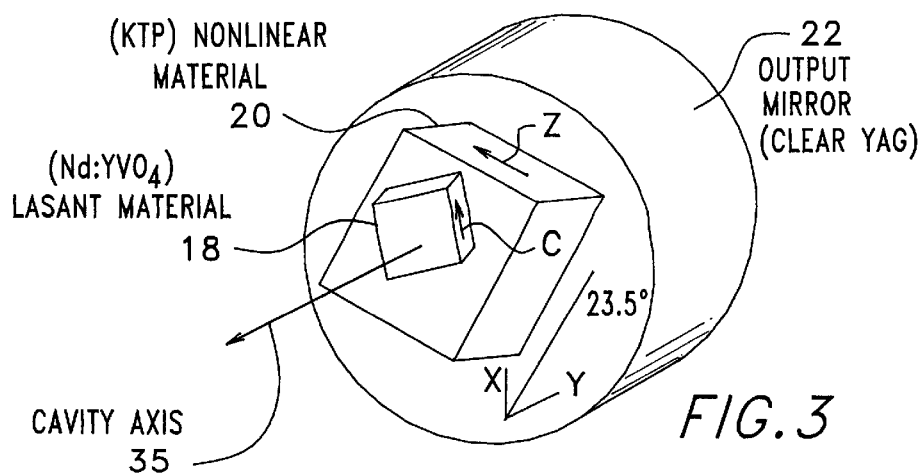
FIG. 3 is a diagrammatic illustration showing the axis configuration of the laser of FIG. 2.

The polarization eigenvectors of the laser resonator at 1064 nm can be solved using Jones Matrix analysis. As illustrated in FIG. 3, in a typical frequency doubling laser configuration, (axis configuration shown in FIG. 3) the nonlinear material 20 (in this case KTP) z axis, which extends perpendicular to a longitudinal axis 35 of the resonator 14, is rotated 45 degrees with respect to the lasant material 18 (in this case Nd:YVO$_4$) c axis which also extends perpendicular to longitudinal axis 35 of the resonator. The Nd:YVO$_4$ c axis also extends parallel with the polarization direction of the pumping beam 24. The Nd:YVO$_4$ is a-axis cut. In other words, the a axis is along longitudinal axis 35 of the resonator. The KTP is cut at $\Theta=90°$ and $\phi=23.5°$ for optimum type II phase matching at 1064 nm, where $\Theta$ and $\phi$ are polar angles referring to Z and X axes. In general, there are two eigenvectors that represent two polarization modes corresponding to the polarization eigenfunction at 1064 nm. Each polarization mode is linearly polarized at output mirror 22. The polarization angle between them depends on the retardation of the KTP and Nd:YVO$_4$. In a special case where the retardation of the KTP is a multiple of a half-wave, the polarization angle between each polarization mode is 90 degrees and is not dependent on the retardation of the Nd:YVO$_4$. The time average of the sum frequency term between these two orthogonally polarized modes is zero. Noise free second harmonic output is generated from two orthogonally polarized lasing modes which have minimum sum frequency coupling. This is one important aspect of this invention.

In the lasant material, one polarization mode lases along the c axis, and the other lases along the a axis. The reason that there is another polarization mode lasing along the a axis is due to the spatial hole burning effect. In one preferred embodiment of the present invention, lasant material 18 is placed against or near the input mirror. Two benefits results. First, because the index of refraction on each axis is quite different, the polarization mode on the a axis dephases from the one on the c axis in a very short distance and builds up its oscillation from the gain undepleted by the mode on the c axis. Second, on each axis (a or c), there should exist only a single polarization mode at the first given fundamental wavelength because of the spatial hole burning effect. Placement of the lasant material or laser gain medium near the input mirror to encourage two orthogonally polarized modes oscillating is another important aspect of the present invention.

In another special configuration of the laser system, a degeneracy of polarization eigenstates occurs when the KTP and the Nd:YVO$_4$ both are multiple order half wave plates at or about 1064 nm. In one degenerate state, one polarization oscillates along the Nd:YVO$_4$ c axis and the other oscillates along the Nd:YVO$_4$ a axis. Also, the laser can choose to lase in another degenerate state, in which one polarization mode lases along the KTP z axis and the other lases perpendicular to z axis. The occurrence of degenerate states is not desirable. It creates additional mode instabilities. Further, the second degenerate state is inefficient for frequency doubling. Thus, for improved stability, it is preferred to configure the Nd:YVO$_4$ as a quarter wave plate at or about 1064 nm. Although, not configuring the Nd:YVO$_4$ as a half wave plate is usually sufficient to avoid the degeneracy.

By configuring nonlinear material 20 as a half wave plate relative to the first given wavelength and placing the lasant material or gain medium 18 near the input mirror, an output is produced which composes two substantially orthogonal, linearly polarized modes at about the first given wavelength. Since material 20 is a nonlinear material, it also produces second harmonic wave 30 made up of multiple modes of green light at wavelengths at and/or about one half the first given wavelength. Furthermore, since fundamental wave 26 includes an additional mode at the second given wavelength, the nonlinear material outputs an additional mode or modes of 1084 nm along with additional second harmonic waves which are associated with the 1084 nm mode.

Because the nonlinear material is configured as a half wave plate or a multiple of a half wave plate relative to the 1064 nm wavelength, two substantially orthogonal linear polarized modes at or about 1064 nm result. These two modes do not couple strongly to each other and lead to minimized instabilities in the amplitude of these modes. However, there still exists a mode or modes at or about 1084 nm which is relatively close to the 1064 nm wavelength. Even if these modes are not within the phase matching bandwidth of the KTP, they can still couple with the 1064 nm modes through sum frequency generation to create a significant potential noise problem.

In accordance with the present invention, laser resonator 14 further includes a specifically configured filter arrangement 32. In the embodiment shown in FIG. 2, filter arrangement 32 takes the form of a coating formed on the inner surface, or outer surface of output mirror 22. In this configuration, filter arrangement 32 is designed to allow the 1084 nm modes to pass out of resonator 14 immediately after being formed in the lasant material and passing through the nonlinear material. Filter arrangement 32 must also be configured to pass the second harmonic modes as would normally be the case for the output mirror. However, because the 1084 nm modes are so close in wavelength to the 1064 nm modes, the filter arrangement must be carefully constructed to pass the 1084 nm wavelength and reflect the 1064 nm wavelength. This allows the perpetuation of the desired laser action for the 1064 nm wavelength while eliminating the potential problems associated with allowing the perpetuation of the laser action for the 1084 nm mode.

Figure 4:
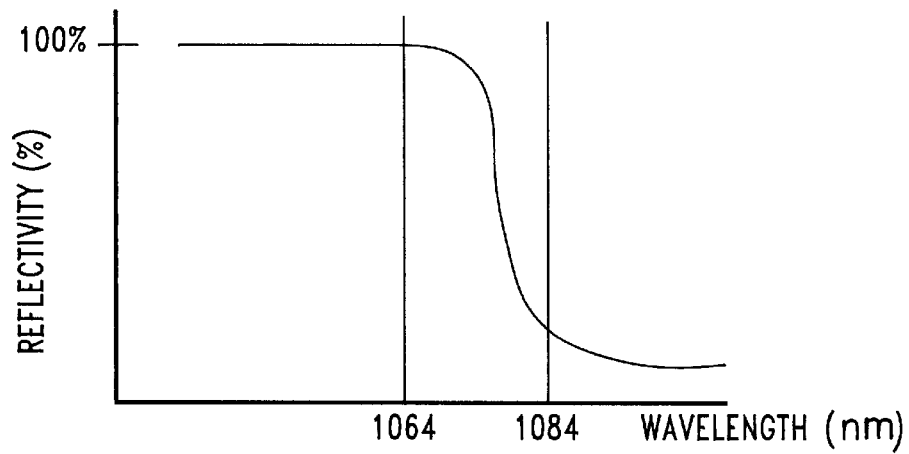
FIG. 4 is a graph illustrating a first embodiment of a coating design for producing a filter in accordance with the present invention.
Figure 5:
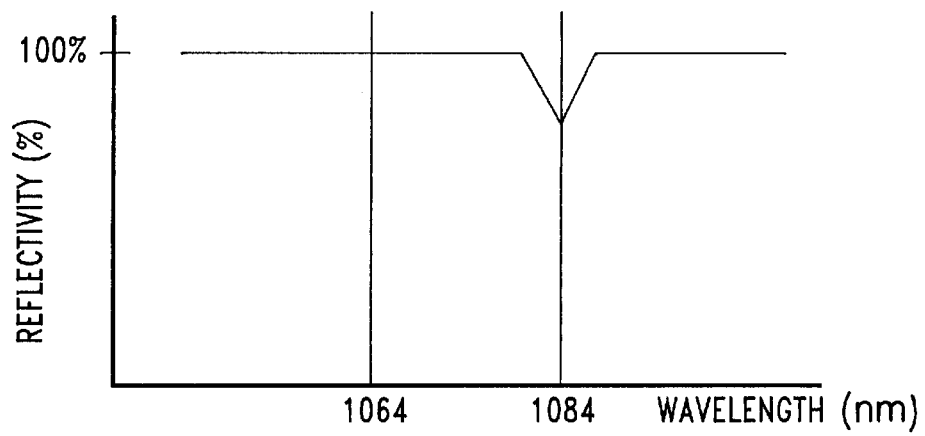
FIG. 5 is a graph illustrating a second embodiment of a coating design for producing a filter in accordance with the present invention.

Filter arrangement 32 may take on a wide variety of specific forms so long as it removes the 1084 nm modes from the resonator. The preferred dielectric coating process is ion-beam sputtering because this type of high density coating is usually temperature insensitive and has sharp spectral features. That is, this process is able to separate closely spaced spectral lines. Other coating processes such as ion-assisted deposition, electron beam evaporation processes can also be applied as well. Coating designs can take various forms. Some examples of such coating designs are standard long pass filters or V-type spike coating as generally shown in FIGS. 4 and 5. Although only a few specific coating examples are given, it should be understood that a wide variety of materials, or combinations of materials, may be used so long as they perform the proper filtering function. All of these various materials would equally fall within the scope of the present invention.

In an alternative embodiment of the present invention, the output mirror may be configured to reflect the 1084 nm modes back into the resonator. In this embodiment, the input mirror may be configured to allow the 1084 to pass from the resonator. Alternatively, a separate 1084 nm filter may be positioned within the laser resonator. For example, this separate filter may take the form of a beam splitter that would be positioned at an angle within the resonator and be arranged to direct the 1084 nm mode(s) out of a side window in the resonator while allowing the 1064 nm modes the continue traveling back and forth within the resonator.

Figure 6:
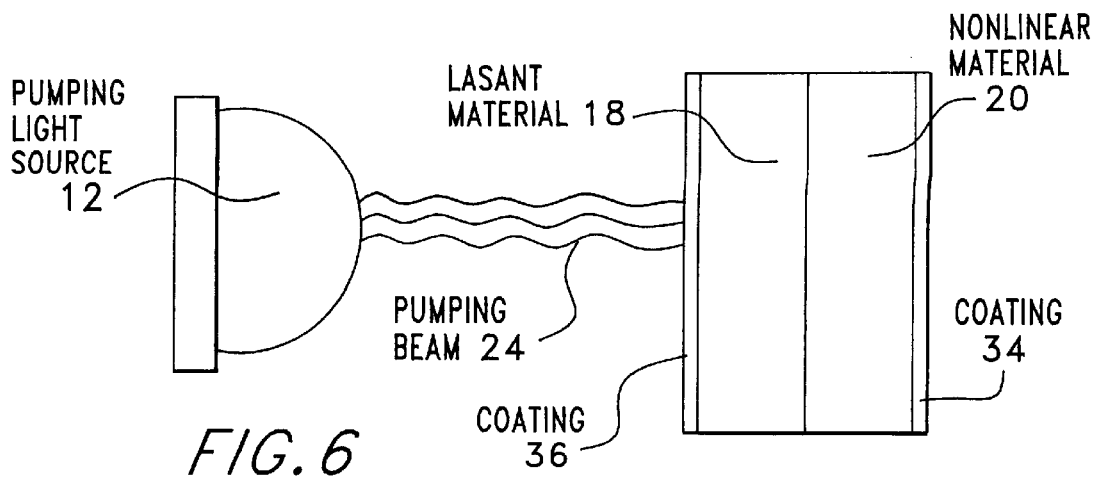
FIG. 6 is a diagrammatic illustration of a second embodiment of a laser in accordance with the present invention.

Although the input mirror and the output mirror are shown in FIG. 2 as being separate components, this is not a requirement. In the case of FIG. 2, the output mirror is formed from clear YAG. Alternatively, the output mirror, and for that matter the input mirror, may be formed from any suitable transparent material. In another embodiment illustrated in FIG. 6, the output mirror may be formed using a coating 34 applied to the output side of nonlinear material 20. This would eliminate the need for a separate output mirror component. In a similar fashion and as illustrated in FIG. 6, the input mirror may take the form of a coating 36 applied to input side of the lasant material. All of these various configurations, as well as other configurations, would equally fall within the scope of the present invention so long as they were arranged to suppress the additional undesired mode (i.e. the 1084 nm for Nd:YVO$_4$) from oscillation inside the resonator.

Although the above described embodiments have been describe with the various components having particular respective orientations, it should be understood that the present invention may take on a wide variety of specific configurations with the various components being located in a wide variety of positions and mutual orientations and still remain within the scope of the present invention. For example, although the laser resonator has been illustrated as being arranged with the components aligned along a central axis, this is not a requirement. Alternatively, the optical path of the laser may have an L shape or a variety of other shapes. Also, although the filter has been described as being located at one of the ends of the resonator, this is not a requirement. For example, the filter may take the form of an angled filter located between the lasant material and the nonlinear material. In this arrangement, the filter would be configured to reflect or refract the undesired additional wavelength (i.e. the 1084 nm wavelength in the case of Nd:YVO$_4$) out of the lasers optical path while allowing the main oscillation wavelength to continue along the optical path of the laser.

Furthermore, although the invention has been describe in detail using the example of Nd:YVO$_4$ as the lasant material and KTP as the nonlinear material, it should be understood that the invention is not limited to a laser including these specific materials. Instead, other lasant materials and nonlinear materials, such as those described above, also fall within the scope of the invention. Therefore, the present examples are to be considered as illustrative and not restrictive, and the invention is not to be limited to the details given herein, but may be modified within the scope of the appended claims.

REFERENCES

[1] J. E. Geusic, et al. "Continuous 0.532 $\mu$ solid-state source using Ba$_2$NaNb$_5$O$_{15}$", Appl. Phys. Lett. Vol. 12, pp. 306–308, 1968.

[2] K. C. Liu and M. G. Cohen, "High power Nd:YAG laser at 532 nm using intracavity type II KTP", in Proc., Conference Lasers Electro-Opt., 1986, paper TUK36; see also U.S. Pat. Nos. 4,618,957, and 4,617,666, October 1986.

[3] R. A. Fields, M. Birnbaum, and C. L. Fincher: Appl. Phys. Lett. 51 (1987) 1885.

[4] T. M. Baer, "Large-amplitude fluctuations due to longitudinal mode coupling in diode-pumped intracavity-doubled Nd:YAG lasers", J. Opt. Soc. Amer. B., vol. 3, pp. 1175–1180, 1986.

[5] T. Baer and M. S. Keirstead, "Laser Diode Pumped Solid State Laser" U.S. Pat. No. 4,656,635, 1987.

[6] M. Oka, U.S. Pat. No. 5,197,073 "Solid-State Laser in Which the Two Polarization Modes of The Fundamental Wave Laser Beam Oscillate in a Single Longitudinal Mode", 1991.

[7] W. L. Nighan, et al, U.S. Pat. No. 5,446,749, 1995.

What is claimed is:

1. A laser comprising:
    a pumping light source which emits a predetermined optical pumping beam of radiation;
    a laser resonator including an input mirror optically coupled to the pumping light source for receiving and passing therethrough the optical pumping beam, an output mirror, a lasant material, and a nonlinear optical material,
        the lasant material being a material which lases in response to the predetermined optical pumping beam of radiation from the pumping light source so as to generate a fundamental wave including multiple linearly polarized modes at wavelengths at and/or about a first given wavelength and an additional mode at and/or about a second given wavelength relatively close to but different from the first given wavelength;
        the nonlinear optical material and the lasant material being positioned relative to the input mirror and the output mirror such that (i) the lasant material receives as its input the optical pumping beam after the pumping beam is caused to pass through the input mirror, (ii) the nonlinear optical material receives the fundamental wave generated by the lasant material as an input, and (iii) the output mirror receives an output from the nonlinear optical material,
        the nonlinear optical material being configured to act as a half wave plate or a multiple of a half wave plate and the nonlinear material producing as its output an output wave including (i) two substantially orthogonal linearly polarized modes at wavelengths at and/or about the first given wavelength, (ii) multiple second harmonic linearly polarized modes at wavelengths at and/or about one half the wavelength of the first given wavelength, and (iii) an additional mode at and/or about the second given wavelength; and
    the laser resonator further including a filter arrangement for allowing the additional mode at and/or about the second given wavelength to pass from the laser resonator as it is produced and for allowing at least a portion of the second harmonic modes to pass from the resonator as the laser output.

2. A laser according to claim 1 wherein the lasant material is placed close to the input mirror of the laser resonator to make use of the spatial hole-burning effect for encouraging two orthogonal linear polarized mode oscillating in the resonator.

3. A laser according to claim 1 wherein the lasant material is neodymium yttrium vanadate (Nd:YVO$_4$), the first given wavelength is 1064 nm, and the second given wavelength is 1084 nm.

4. A laser according to claim 3 wherein the filter arrangement includes a coating material which passes wavelengths at and/or about 1084 nm and 532 nm and reflects wavelengths at and/or about 1064 nm.

5. A laser according to claim 1 wherein the lasant material is Nd:YAG, the first wavelength is 1064 nm, and the second given wavelength is 1061 nm.

6. A laser according to claim 5 wherein the filter arrangement includes a coating material which passes wavelengths at and/or about 1061 nm and 532 nm and reflects wavelengths at and/or about 1064 nm.

7. A laser according to claim 1 wherein the lasant material is Nd:YLF, the first wavelength is 1047 nm, and the second given wavelength is 1053 nm.

8. A laser according to claim 7 wherein the filter arrangement includes a coating material which passes wavelengths at and/or about 1053 nm and 523.5 nm and reflects wavelengths at and/or about 1047 nm.

9. A laser according to claim 1 wherein the nonlinear material is potassium titanate phosphate (KTP).

10. A laser according to claim 1 wherein the filter arrangement includes a coating material which passes wavelengths at and/or about the second given wavelength and the second harmonic wavelengths and reflects wavelengths at and/or about the first given wavelength, the coating material being located on the output mirror.

11. A laser according to claim 10 wherein the output mirror is a clear YAG material.

12. A laser according to claim 1 wherein the filter arrangement includes a coating material which passes wavelengths at and/or about the second given wavelength and the second harmonic wavelengths and reflects wavelengths at and/or about the first given wavelength, the coating material being located on the output mirror side of the nonlinear material.

13. A laser according to claim 1 wherein the lasant material is configured to act as a quarter wave plate.

14. A laser resonator for use in a laser, the laser resonator comprising:
    an input mirror for receiving and passing therethrough predetermined optical pumping beam of radiation;
    a lasant material which lases in response to the predetermined optical pumping radiation so as to generate a fundamental wave including multiple linearly polarized modes at wavelengths at and/or about a first given wavelength and an additional mode at and/or about a second given wavelength relatively close to but different from the first given wavelength, the lasant material being positioned such that it receives as its input the output from the input mirror;
    a nonlinear optical material configured to act as a half wave plate or a multiple of a half wave plate and the nonlinear material being positioned such that the nonlinear optical material receives the fundamental wave generated by the lasant material as an input, the nonlinear optical material producing as its output an output wave including (i) two substantially orthogonal linearly polarized modes at wave ths at and/or about the first given wavelength, (ii) multiple second harmonic linearly polarized modes at wavelengths at and/or about one half the first given wavelength, and (iii) an additional mode at a wavelength at and/or about the second given wavelength;
    an output mirror positioned to receive the output from the nonlinear optical material; and
    a filter arrangement for allowing the additional mode at and/or about the second given wavelength to pass from the laser resonator as it is produced and for allowing at least a portion of the second harmonic modes to pass from the resonator as a laser output.

15. A laser resonator according to claim 14 wherein the lasant material is placed close to the input mirror of the laser resonator to make use of the spatial hole-burning effect for encouraging two orthogonal linear polarized mode oscillating in the resonator.

16. A laser resonator according to claim 14 wherein the lasant material is neodymium yttrium vanadate (Nd:YVO$_4$), the first given wavelength is 1064 nm, the second given wavelength is 1084 nm, and the filter arrangement includes a coating material which passes wavelengths at and/or about 1084 nm and 532 nm and reflects wavelengths at and/or about 1064 nm.

17. A laser resonator according to claim 14 wherein the nonlinear material is potassium titanate phosphate (KTP).

18. A laser resonator according to claim 14 wherein the lasant material is configured to act as a quarter wave plate.

19. A method of producing laser light comprising:
   directing a pumping light source having a predetermined optical pumping beam radiation into a laser resonator including an input mirror, an output mirror, a lasant material, and a nonlinear optical material configured to act as a half wave plate or a multiple of a half wave plate, the lasant material being a material which lases in response to the pumping beam thereby generating a fundamental wave including multiple linearly polarized modes at wavelengths at and/or about a first given wavelength and an additional mode at a wavelength at and/or about a second given wavelength relatively close to but different than the first given wavelength;
   positioning the nonlinear optical material relative to the lasant material such that the nonlinear optical material receives the fundamental wave generated by the lasant material as its input thereby causing the nonlinear optical material to produce as its output an output wave including (i) two substantially orthogonal linearly polarized modes at wavelengths at and/or about the first given wavelength, (ii) multiple second harmonic linearly polarized modes at wavelengths at and/or about one half of the first given wavelength, and (iii) an additional mode at a wavelength at and/or about the second given wavelength; and
   using a filter arrangement within the laser resonator, allowing the additional mode at and/or about the second given wavelength to pass from the laser resonator as it is produced and allowing at least a portion of the second harmonic modes to pass from the resonator as a laser output.

20. A method according to claim 19 the step of directing a pumping light source into a laser resonator includes the step of directing a pumping light source into a laser resonator in which the lasant material of the laser resonator is placed close to the input mirror of the laser resonator to make use of the spatial hole-burning effect for encouraging two orthogonal linear polarized mode oscillating in the resonator.

21. A method according to claim 19 wherein the lasant material is neodymium yttrium vanadate (Nd:YVO$_4$), the first given wavelength is 1064 nm, the second given wavelength is 1084 nm, and the step of allowing the mode at and/or about the second given wavelength to pass from the laser resonator includes the step of using a coating material within the laser resonator which is configured to pass wavelengths at and/or about 1084 nm and 532 nm and reflect wavelengths at and/or about 1064 nm.

22. A method according to claim 19 wherein the lasant material is Nd:YAG, the first wavelength is 1064 nm, the second given wavelength is 1061 nm, and the step of allowing the mode at and/or about the second given wavelength to pass from the laser resonator includes the step of using a coating material within the laser resonator which is configured to pass wavelengths at and/or about 1061 nm and 532 nm and reflects wavelengths at and/or about 1064 nm.

23. A method according to claim 19 wherein the lasant material is Nd:YLF, the first wavelength is 1047 nm, the second given wavelength is 1053 nm, and the step of allowing the mode at and/or about the second given wavelength to pass from the laser resonator includes the step of using a coating material within the laser resonator which is configured to pass wavelengths at and/or about 1053 nm and 523.5 nm and reflects wavelengths at and/or about 1047 nm.

24. A method according to claim 19 wherein the nonlinear material is potassium titanate phosphate (KTP).

25. A method according to claim 19 wherein the filter arrangement includes a coating material which passes wavelengths at and/or about the second given wavelength and the second harmonic wavelengths and reflects wavelengths at and/or about the first given wavelength, the coating material being located on the output mirror.

26. A method according to claim 25 wherein the output mirror is a clear YAG material.

27. A method according to claim 19 wherein the filter arrangement includes a coating material which passes wavelengths at and/or about the second given wavelength and the second harmonic wavelengths and reflects wavelengths at and/or about the first given wavelength, the coating material being located on the output mirror side of the nonlinear material.

28. A method according to claim 19 wherein the lasant material is configured to act as a quarter wave plate.

29. A method according to claim 19 wherein the input mirror is a highly reflective coating at the fundamental wavelength which is directly applied on the lasant material.

* * * * *